(12) United States Patent
Pattanayak et al.

(10) Patent No.: US 11,868,696 B2
(45) Date of Patent: Jan. 9, 2024

(54) LIGHTWEIGHT UNIFIED POWER FORMAT IMPLEMENTATION FOR EMULATION AND PROTOTYPING

(71) Applicant: Synopsys, Inc., Mountain View, CA (US)

(72) Inventors: Swarup Kumar Pattanayak, Bengaluru (IN); Prathamesh Chandrashekhar Joshi, Westborough, MA (US)

(73) Assignee: Synopsys, Inc., Sunnyvale, CA (US)

( * ) Notice: Subject to any disclaimer, the term of this patent is extended or adjusted under 35 U.S.C. 154(b) by 145 days.

(21) Appl. No.: 17/553,649

(22) Filed: Dec. 16, 2021

(65) Prior Publication Data

US 2022/0207225 A1     Jun. 30, 2022

Related U.S. Application Data

(60) Provisional application No. 63/132,550, filed on Dec. 31, 2020.

(51) Int. Cl.
*G06F 30/30*     (2020.01)
*G06F 30/347*    (2020.01)

(52) U.S. Cl.
CPC ................. *G06F 30/347* (2020.01)

(58) Field of Classification Search
CPC ............... G06F 30/347; G06F 2117/04; G06F 2119/06; G06F 30/337
USPC ........................................................ 716/116
See application file for complete search history.

(56) References Cited

U.S. PATENT DOCUMENTS

| 9,703,921 | B1* | 7/2017 | Lin ......................... G06F 30/33 |
| 10,162,917 | B1* | 12/2018 | Peixoto ................. G06F 30/398 |
| 10,222,421 | B1* | 3/2019 | Srivastava ......... G01R 31/2813 |
| 10,769,329 | B1* | 9/2020 | Chilwal ................ G06F 30/337 |
| 2010/0264735 | A1* | 10/2010 | Yamaoka ............... G06F 1/3287 307/43 |
| 2013/0305207 | A1* | 11/2013 | Hsieh .................... G06F 30/367 716/136 |

* cited by examiner

*Primary Examiner* — Jack Chiang
*Assistant Examiner* — Brandon Bowers
(74) *Attorney, Agent, or Firm* — Patterson + Sheridan, LLP (57) ABSTRACT

A method for designing a circuit includes adding, to a circuit design, a power switch configured to produce only one output over an acknowledgement port. The power switch does not include input and output supply ports. The method also includes adding, to the circuit design, an isolation circuit in which only one select pin is used to produce an output. The isolation circuit does not include isolation power and retention circuitry. The method also includes adding, to the circuit design, a retention circuit. The retention circuit includes a clock gating enabled register, a first AND gate connected to a clear pin of the register, and a second AND gate connected to a chip enable pin of the register. The method further includes compiling, by a processing device, the circuit design.

20 Claims, 10 Drawing Sheets

LIGHTWEIGHT UNIFIED POWER FORMAT IMPLEMENTATION FOR EMULATION AND PROTOTYPING

CROSS-REFERENCE TO RELATED APPLICATIONS

This application claims priority to and the benefit of U.S. Provisional Patent Application Ser. No. 63/132,550, entitled "Lightweight Unified Power Format Implementation for Emulation and Prototyping," filed Dec. 31, 2020, which is incorporated herein by reference in its entirety.

TECHNICAL FIELD

The present disclosure relates to low power verification with emulation and prototyping.

BACKGROUND

The Unified Power Format (UPF) is a standard for specifying power intent in power optimization of circuit design automation. A UPF solution in emulation and prototyping implements full power intent defined in UPF. Implementing the UPF full power intent, however, causes significant increases in compile time, decreases in performance, and increases in hardware (HW) consumption compared to non-UPF models. Additionally, many users can verify their designs without need for explicit shutdown of the power domain. As a result, shutdown-related logic implementation goes unused in many emulation and prototyping scenarios.

SUMMARY

A method, computer system, and computer program product for designing a circuit are described herein. According to an embodiment, a method for designing a circuit includes adding, to a circuit design, a power switch configured to produce only one output over an acknowledgement port. The power switch does not include input and output supply ports. The method also includes adding, to the circuit design, an isolation circuit in which only one select pin is used to produce an output. The isolation circuit does not include isolation power and corruption circuitry. The method also includes adding, to the circuit design, a retention circuit. The retention circuit includes a clock gating enabled register, a first AND gate connected to a clear pin of the register, and a second AND gate connected to a chip enable pin of the register. The method further includes compiling, by a processing device, the circuit design.

Adding the retention circuit may include adding the register to the circuit design based on removing a previous register that lacked a chip enable pin.

The first AND gate may prevent the register from resetting during a retain period.

The register may hold an input value based on a control signal to the first and second AND gates.

The method may include adding, to the circuit design, a global register that provides runtime control over the isolation circuit and the retention circuit.

The method may include connecting a clock signal to the isolation circuit.

Adding the power switch, the isolation circuit, and the retention circuit may be based on a user selection indicating that a lightweight Unified Power Format implementation should be used.

According to another embodiment, a computer system for designing a circuit includes a memory and a hardware processor communicatively coupled to the memory. The hardware processor adds, to a circuit design, a power switch that produces an output over an acknowledgement port. The power switch does not include input and output supply ports. The hardware processor also adds, to the circuit design, an isolation circuit in which a select pin is used to produce an output. The isolation circuit does not include isolation power and corruption circuitry. The hardware processor also adds, to the circuit design, a retention circuit. The retention circuit includes a clock gating enabled register, a first AND gate connected to a clear pin of the register, and a second AND gate connected to a chip enable pin of the register. The hardware processor also compiles the circuit design.

Adding the retention circuit may include adding the register to the circuit design based on removing a previous register that lacked a chip enable pin.

The first AND gate may prevent the register from resetting during a retain period.

The register may hold an input value based on a control signal to the first and second AND gates.

The hardware processor may add, to the circuit design, a global register that provides runtime control over the isolation circuit and the retention circuit.

The hardware processor may connect a clock signal to the isolation circuit.

Adding the power switch, the isolation circuit, and the retention circuit may be based on a user selection indicating that a lightweight Unified Power Format implementation should be used.

According to another embodiment, a non-transitory computer-readable medium stores computer instructions that, when executed, cause a processor to perform an operation for designing a circuit. The operation includes adding, to a circuit design, a power switch that produces an output over an acknowledgement port. The power switch does not include input and output supply ports. The operation also includes adding, to the circuit design, an isolation circuit in which a select pin is used to produce an output. The isolation circuit does not include isolation power and corruption circuitry. The operation further includes adding, to the circuit design, a retention circuit. The retention circuit includes a clock gating enabled register, a first AND gate connected to a clear pin of the register, and a second AND gate connected to a chip enable pin of the register. The operation also includes compiling the circuit design.

Adding the retention circuit may include adding the register to the circuit design based on removing a previous register that lacked a chip enable pin.

The first AND gate may prevent the register from resetting during a retain period.

The register may hold an input value based on a control signal to the first and second AND gates.

The operation may include adding, to the circuit design, a global register that provides runtime control over the isolation circuit and the retention circuit.

The operation may include connecting a clock signal to the isolation circuit.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates an example lightweight Unified Power Format (UPF) flow during the design of a circuit, according to an embodiment of the present disclosure.

DETAILED DESCRIPTION

Aspects of the present disclosure relate to a lightweight Unified Power Format (UPF) implementation for emulation and prototyping. The lightweight implementation simplifies several of the UPF circuits added to a circuit design. For example, certain components of these UPF circuits may be simplified because the UPF features associated with these components may otherwise go unused. As a result of these simplifications, compile time is reduced in certain embodiments. Furthermore, performance is improved (e.g., circuit frequency increases) and hardware costs are reduced.

The lightweight UPF implementation may be an optional mode provided for users who would like to verify isolation and retention features without need for corruption. Isolation features may include the connection and use of isolation cells between power domains in a circuit design. During normal operation, an isolation cell between two power domains operates as a buffer. When the power domain connected to the input of the isolation cell is powered down, the isolation cell clamps its output to prevent the powering down of the power domain at the input of the isolation cell from corrupting the logic in the power domain connected to the output of the isolation cell. Verifying the isolation features in a circuit design may include verifying that isolation cells are properly positioned between connected power domains and that the isolation cells properly clamp their outputs. Verifying the isolation features may also include verifying that the isolation cell prevents a powering down power domain at the input of the isolation cell from corrupting a powered up power domain at the output of the isolation cell. For example, corruption circuitry (e.g., random number generation circuitry) may be included with the isolation cell to simulate the signals generated by the powering down power domain. In some embodiments, users may not desire to simulate the corruption signals. By choosing the lightweight UPF implementation, the corruption circuitry may be excluded, which simplifies the UPF circuit.

Retention features may include the use of retention circuitry (e.g., one or more registers) to store the state information of a power domain when that power domain is powered down to avoid loss of the state information. When the power domain is powered up, the stored state information may be used to assist the power domain to become operational sooner. Verifying the retention features in a circuit design may include verifying that the retention circuitry is properly positioned and that the retention circuitry properly store state information for the power domains. In some embodiments, users may desire to simplify the retention circuitry. By choosing the lightweight UPF implementation, the number of registers in the retention circuitry is reduced, which simplifies the UPF circuit.

Users who would like to use the lightweight UPF implementation may make a selection indicating that the lightweight UPF implementation should be used. The lightweight UPF implementation may differ from a normal UPF implementation in one or more of the following ways:

1. Simplified isolation implementation, which may reduce hardware costs.
2. Simplified retention implementation, which may reduce hardware costs.
3. No full supply network, which may reduce hardware costs and improve compile time and performance.
4. Power switch control and acknowledgement port semantic handling without full implementation of the power switch.

These differentiating components may reduce overall compile time, improve performance, and reduce related hardware costs.

In some embodiments, the lightweight UPF implementation allows emulation and prototyping users to build a lightweight UPF model with which they can verify a majority of their test scenarios. This implementation also encourages users who do not use UPF in emulation by default due to its associated overhead to start using UPF by default, which provides additional verification coverage of isolation and retention implementation. The users also avoid having to use workarounds that may be used in non-UPF model runs due to UPF not being implemented or compiled. The lightweight UPF implementation creates a flow for many emulation and prototyping tests with reduced hardware costs, reduced compile time, and increased runtime performance of the compiled model, in certain embodiments. For example, the lightweight UPF implementation may cause a 30% average improvement in end-to-end total compile times. As yet another example, the lightweight UPF implementation may improve runtime performance across designs as a result of reduced hardware costs and routing congestion. The total hardware cost reduction may be proportional to the original UPF implementation cost. A significant reduction in UPF cost with lightweight implementation may be observed.

Figure 1:
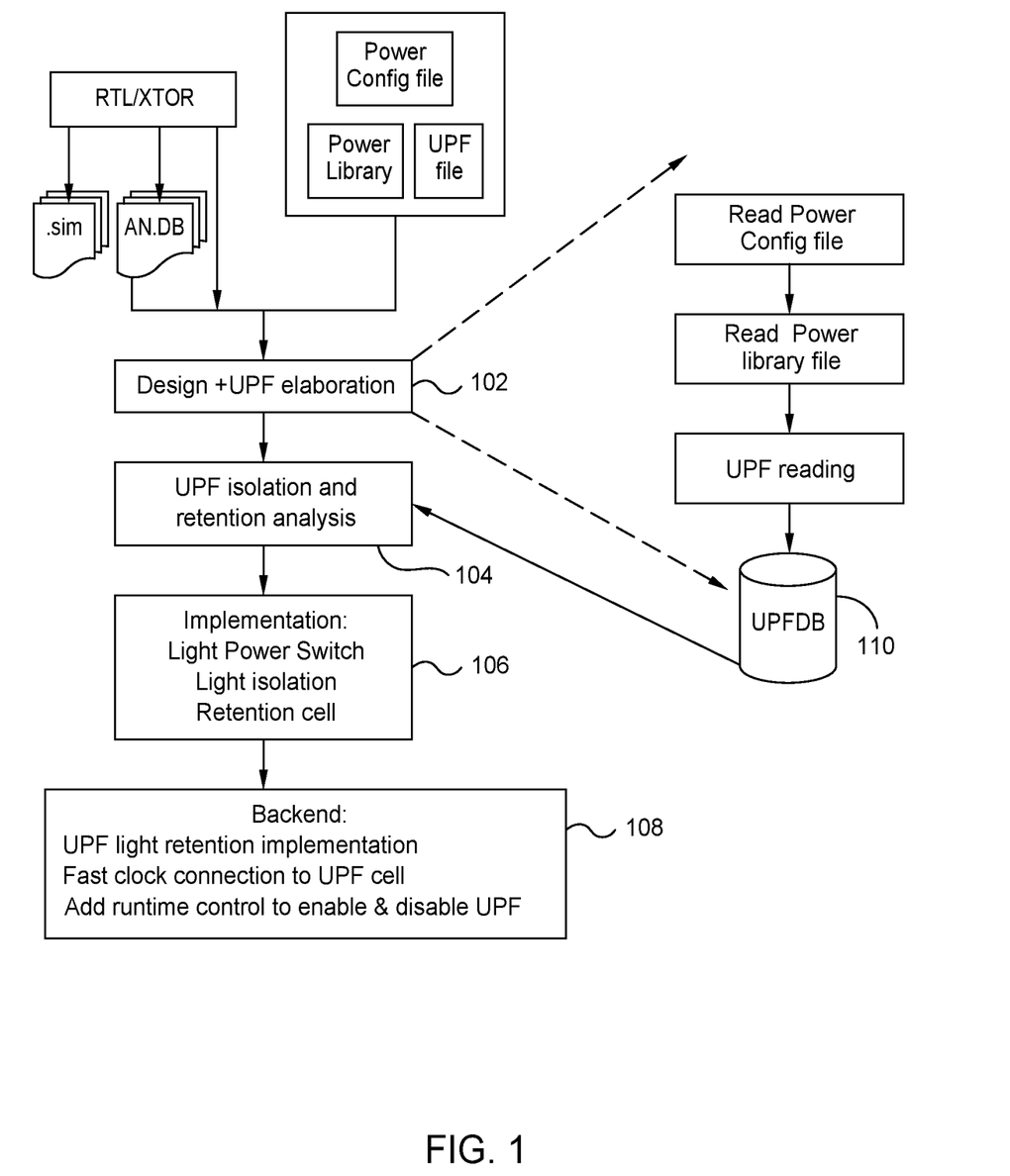

A full UPF implementation may require the routing of an entire supply network in the design, because the supply may be required by all UPF cells (e.g., a corruption cell, isolation cell, and retention cell). The lightweight UPF implementation may reduce hardware costs and routing congestion costs while verifying the always-on functionality of the power sequence of isolation and retention cells. To achieve this, the following steps may be taken, as seen in FIG. 1:

1. Read entire UPF (block 102).
2. Perform isolation analysis according to the rules of the source and sink supplies of a given port specified in the isolation strategy (block 104).

3. Perform retention analysis according to the supply-based rules specified in the retention strategies (block 104).
4. Perform power switch acknowledgement analysis for connecting the power switch acknowledgement port to register transfer level (RTL) signal.
5. Stop corruption analysis and stop adding supply network in the design.
6. Implement lighter power switch without supply input and output (block 106).
7. Implement always-on lighter isolation cell (block 106).
8. Implement always-on lighter retention cell (blocks 106 and 108).

Figure 7:
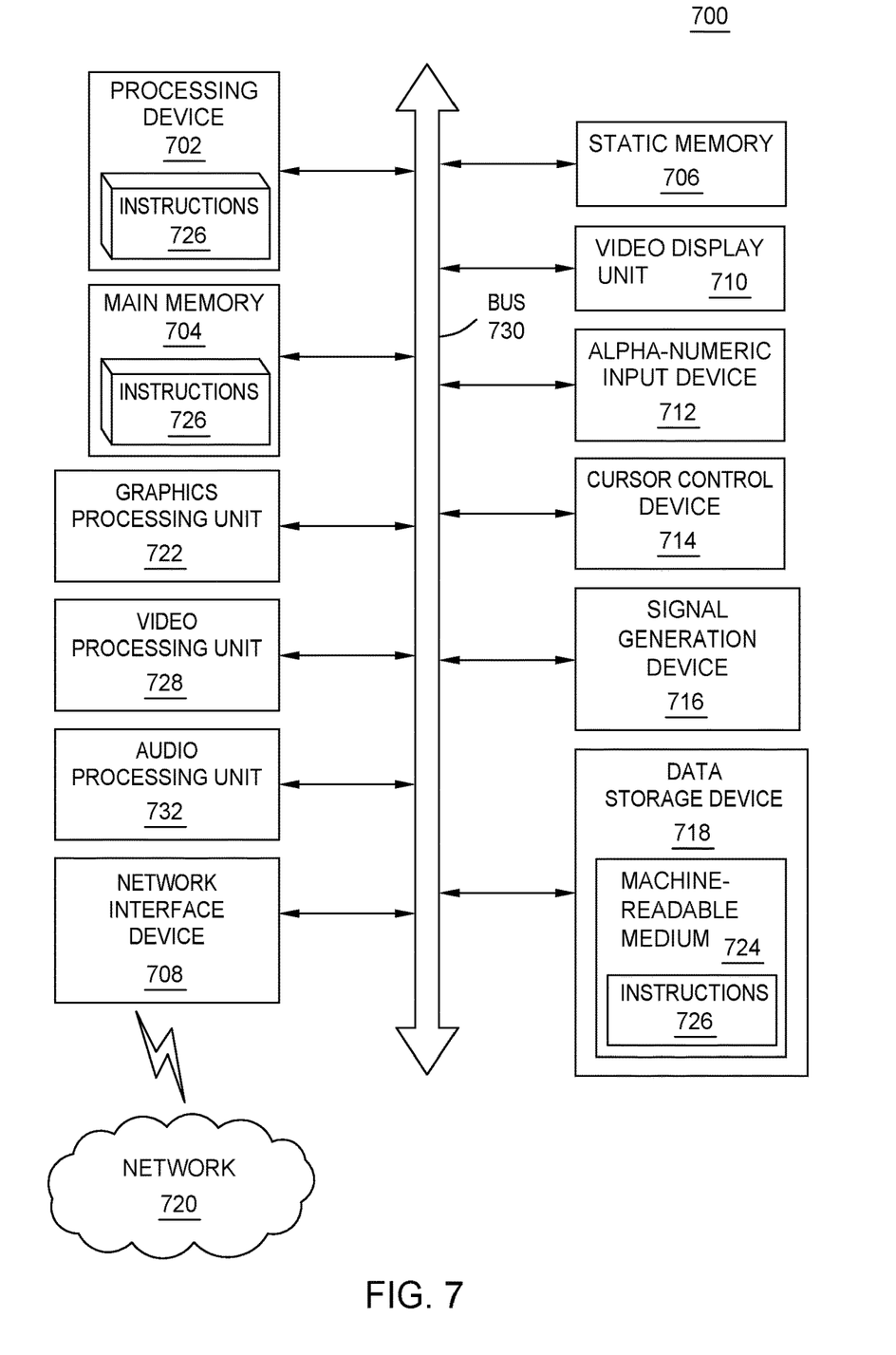
FIG. 7 depicts a diagram of an example computer system in which embodiments of the present disclosure may operate.

These blocks may be performed by a computer system, such as the computer system 700 shown in FIG. 7.

At 102, the computer system may first read a power configuration file that provides additional directives or information (e.g., identification of which power domains should have state retention and annotation of timing for power domains), which may not be provided in the UPF standard. Generally, the power configuration file specifies the power intent of a circuit design using a different format than UPF. The power configuration file may be used for some, but not all, circuit designs. The additional directives and information may be used in subsequent stages. The computer system then reads a power library file to implement supply ports in the design. Although, in the lightweight implementation, there may not be any usage of these ports during implementation, this step may be required to read the UPF and do the correct isolation analysis. The computer system then performs a UPF reading on the design and creates the UPF data model database 110.

At 104, the computer system performs isolation and retention analysis. Isolation analysis is performed to determine the location(s) in the circuit design for isolation circuitry. During this stage, source and sink supplies for each port are considered to determine if the port requires isolation circuitry. For example, the computer may analyze the power sources and power sinks in the circuit design to identify the power domains. The computer system may also determine how and where these power domains are connected to each other, which provides possible locations for isolation circuitry to isolate connected power domains from each other when one of the power domains powers down (e.g., by clamping the output of the isolation circuitry).

Retention analysis is performed to determine the location(s) in the circuit design for a retention circuit. For example, registers, latches, and memory may be detected, because these components may require retention capability. Additionally or alternatively, power domain crossover analysis may be performed to determine the location of isolation and retention circuitry. For example, the computer system may identify where power domains in the circuit design connect to each other. These connections are potential locations for isolation circuitry to isolate the power domains from each other when one of the power domains powers down. Additionally, the connections establish the boundaries of the power domains, which establishes what state information should be retained in which power domains and, as a result, where retention circuitry should be added.

At 106, the computer system implements simplified UPF circuitry. In some embodiments, no supply network is constructed. The system may implement the following cells and connections: light power switch, light isolation circuit, and retention circuit.

Figure 2A:
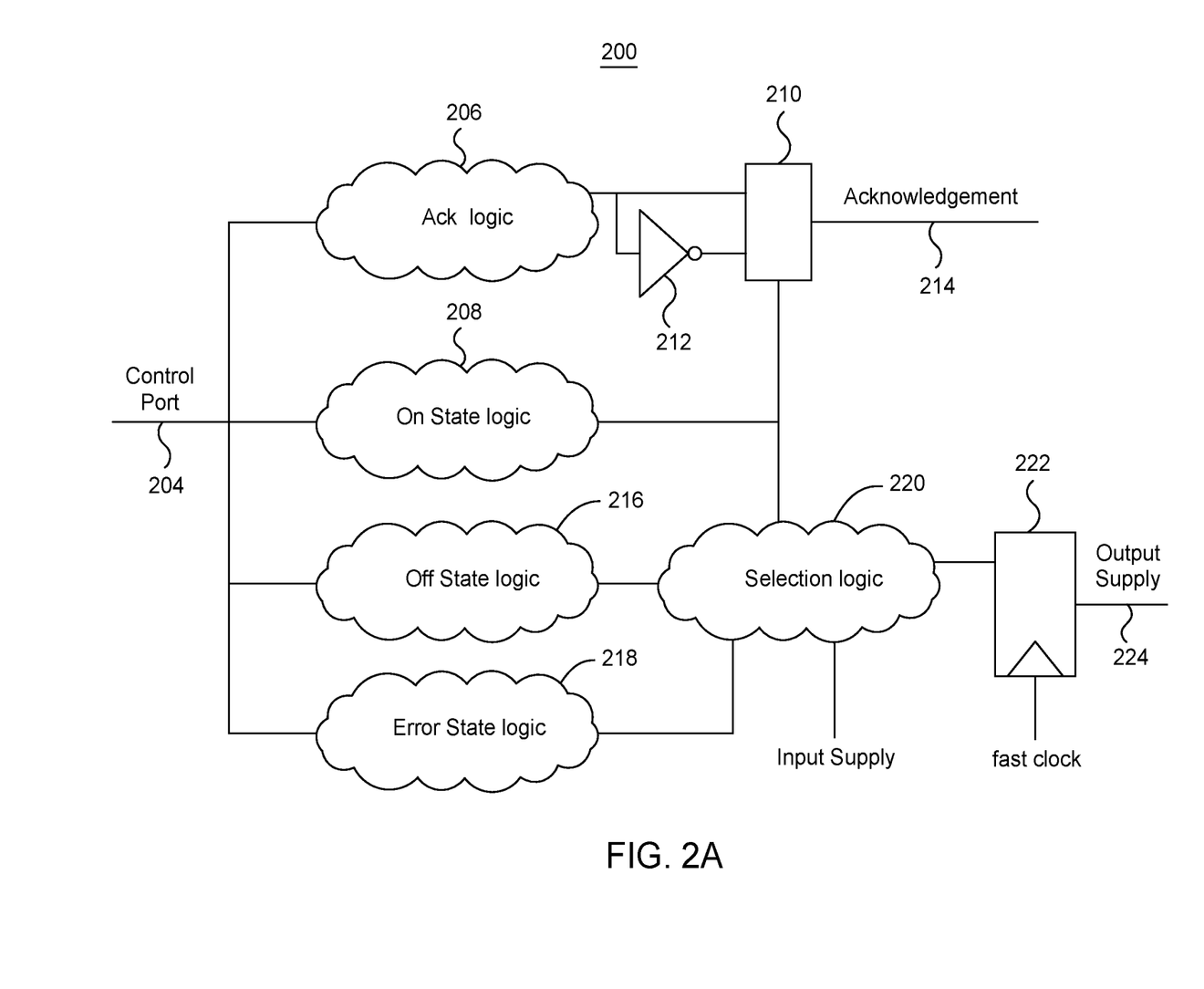
FIG. 2A illustrates an example full power switch implementation.
Figure 2B:
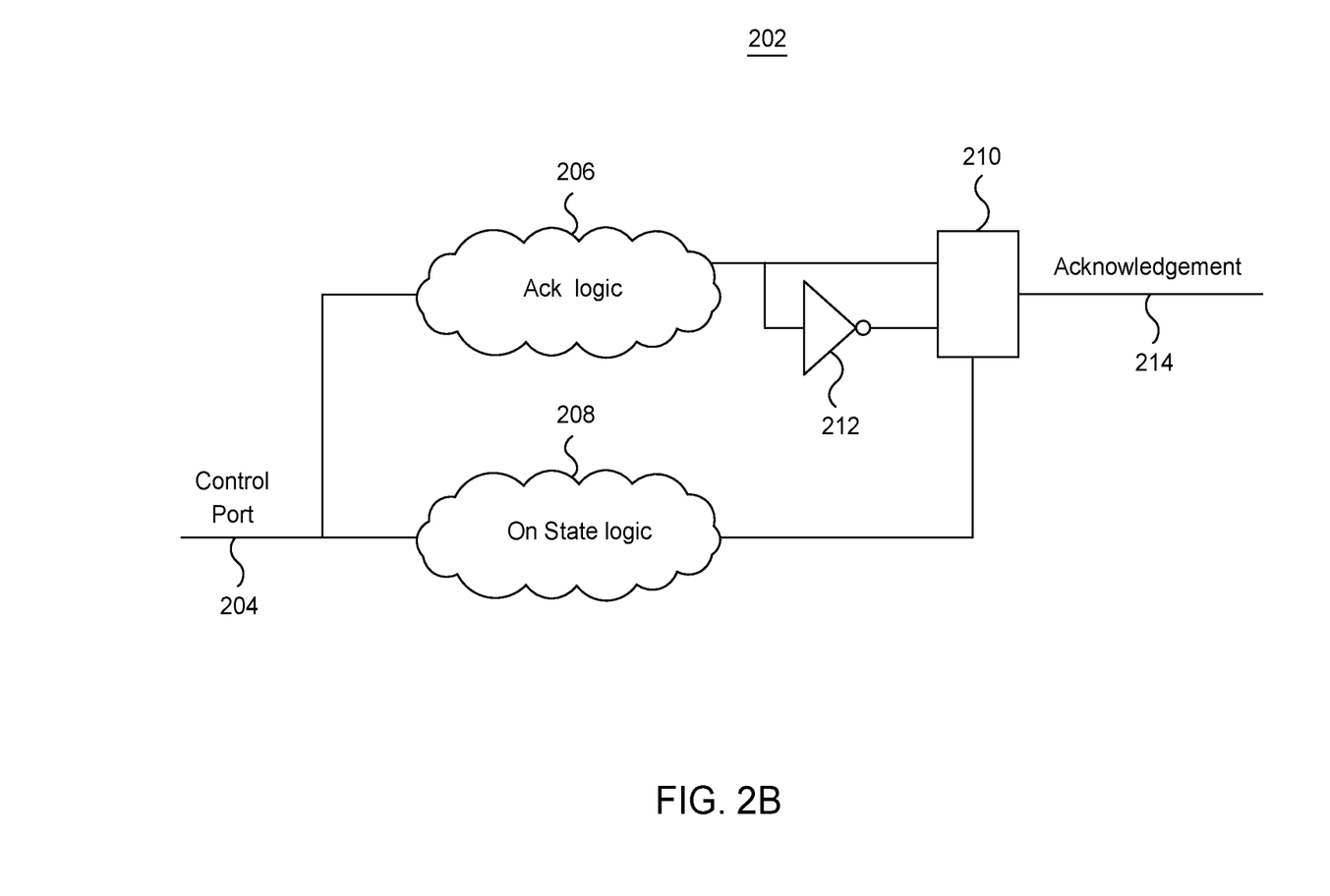
FIG. 2B illustrates an example lightweight power switch implementation in the lightweight UPF flow of FIG. 1, according to an embodiment of the present disclosure.

FIGS. 2A and 2B show differences between a full power switch 200 and a lightweight power switch 202 in the lightweight UPF flow of FIG. 1. As seen in the examples of FIGS. 2A and 2B, the full power switch 200 and the lightweight power switch 202 are the same in that they both include a control port 204, acknowledgement logic 206, on-state logic 208, a register 210, an inverter 212, and an acknowledgement port 214. The full power switch 200 differs from the lightweight power switch 202 in that the full power switch 200 also includes off-state logic 216, error state logic 218, selection logic 220, a register 222, and an output supply port 224. Thus, the lightweight power switch 202 includes fewer logic and hardware components than the full power switch 200. Additionally, the lightweight power switch 202 produces only one output over the acknowledgement port (e.g., an output based on values provided over only the control port 204). The output over the acknowledgement port is controlled by the acknowledgement logic and the on-state logic.

In an example, as the power switch 202 is turned on and off (e.g., based on an on-state or off-state logic expression), acknowledgement values may be determined as follows. If a Boolean expression is specified for the acknowledgement port, this Boolean expression may determine the acknowledge value for transition to on-state (e.g., FULL ON), and the negation of the Boolean expression may determine the acknowledge value for transition to off-state (e.g., OFF). If no Boolean expression with acknowledgement port is specified, the acknowledge value may default to logic 1 for transition to FULL ON and logic 0 for a transition to OFF. The acknowledge value is driven to the acknowledgement port if not already driven.

Figure 3A:
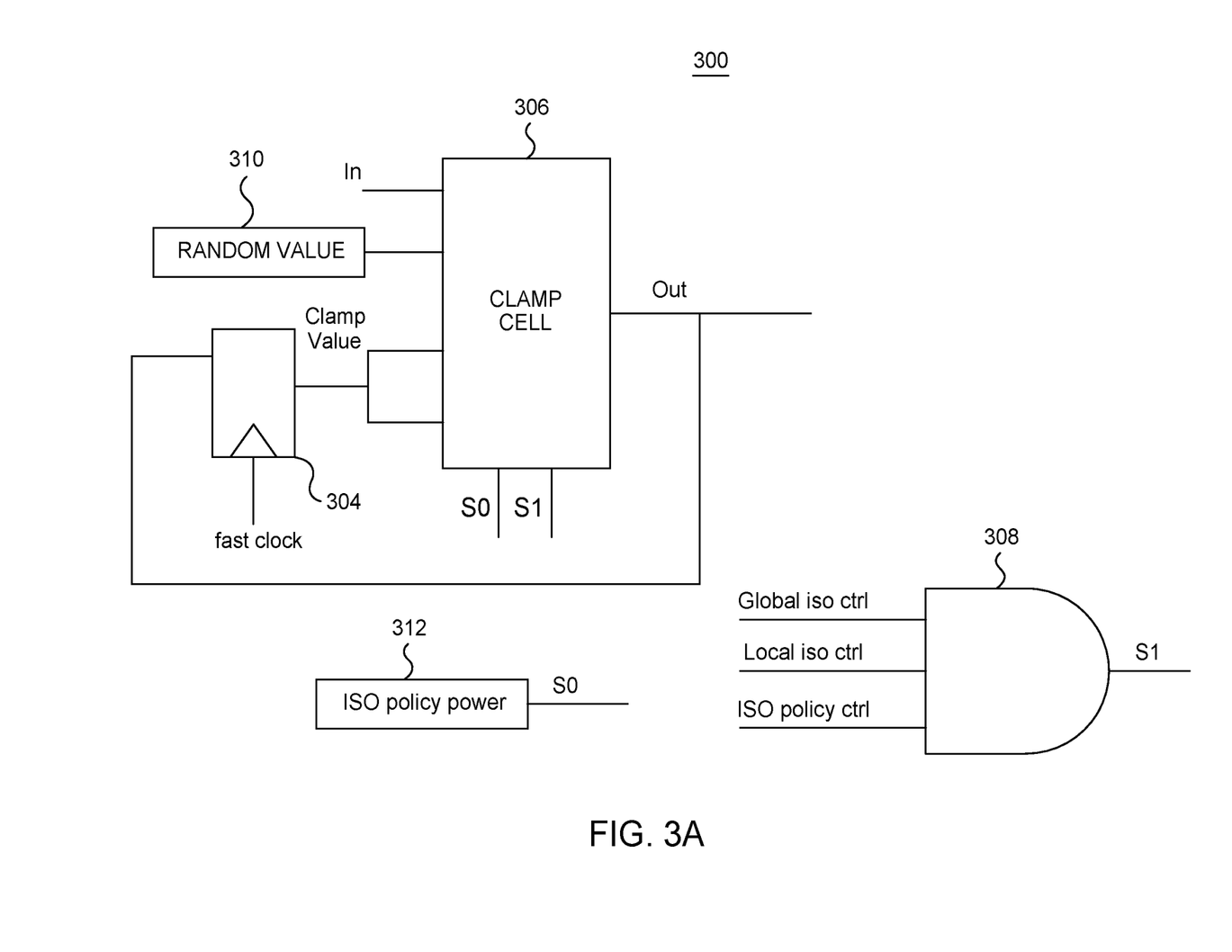
FIG. 3A illustrates an example full isolation circuit.
Figure 3B:
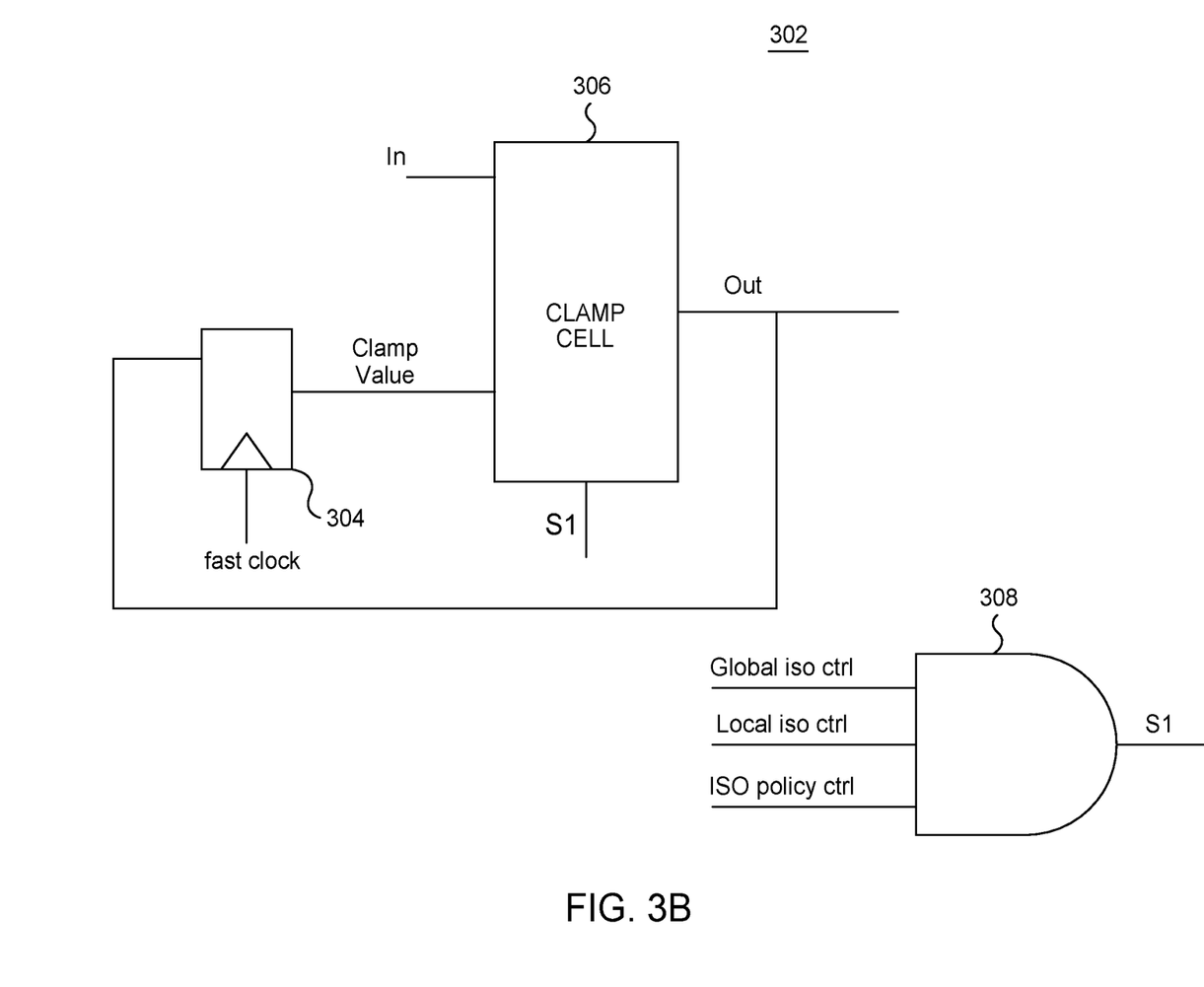
FIG. 3B illustrates an example lightweight isolation circuit in the lightweight UPF flow of FIG. 1, according to an embodiment of the present disclosure.

FIGS. 3A and 3B show differences between a full isolation circuit 300 and a lightweight isolation circuit 302 in the lightweight UPF flow of FIG. 1. As seen in the examples of FIGS. 3A and 3B, the full isolation circuit 300 and the lightweight isolation circuit 302 are the same in that they both include a driver 304, a clamp cell 306, and an AND gate 308. The driver 304 provides a clamp value to the clamp cell 306. The clamp cell 306 is controlled by an output (S1) of the AND gate 308. The full isolation circuit 300 differs from the lightweight isolation circuit 302 in that the full isolation circuit 300 also includes random value circuitry 310 and isolation policy power circuitry 312 that controls the clamp cell 306 (e.g., S0 is for power and S1 is for enable). The random value circuitry 310 may include circuit components (e.g., transducers, amplifiers, and analog-to-digital converters) arranged to generate random numbers to simulate signals generated by a power domain that is powering down. These simulated signals may be used to test whether the clamp cell 306 properly isolates a powering down power domain at the input of the clamp cell 306 from another power domain at the output of the clamp cell 306. The isolation policy power circuitry 312 may include circuit components (e.g., switches and sensors) arranged to power on and power off the clamp cell 306. Thus, by excluding the random value circuitry 310 and the isolation policy power circuitry 312 from the lightweight isolation circuit 302, the lightweight isolation circuit 302 includes fewer logic and hardware components than the full isolation circuit 300. Additionally, the size of the clamp cell 306 is reduced from having four inputs to two inputs. Moreover, removing the random value circuitry 310 further reduces the hardware and circuitry present in the lightweight isolation circuit 302 relative to the full isolation circuit 300.

In an example, in the lightweight isolation circuit 302, as the power may remain always on, the isolation circuit 302 does not need corruption value producing logic (e.g., random value circuitry 310) that simulates signals generated by a power domain when the power domain is powering down. Also, the clamp cell 306 (e.g., a multiplexer and its control logic determining whether to pass a clamp or design value) is controlled by a single pin (e.g., the clamp cell 306 outputs either an input value (In) or a clamped output value (Out) based only on S1). So, the single bit mux select (e.g., S1) is sufficient. Additionally, the driver 304 clock may be the fastest clock of the emulation system. The S0 power pin in the full isolation circuit 300 has been avoided, thus reducing routing congestion. Also, the random value circuitry 310, which includes a linear feedback shift register, three additional registers, and combinational logic for feedback has been avoided.

Retention circuitry may be implemented across blocks 106 and 108 in FIG. 1. For example, basic or full retention circuitry may be added in block 106 and the retention circuity may be optimized to be lightweight in block 108.

Figure 4A:
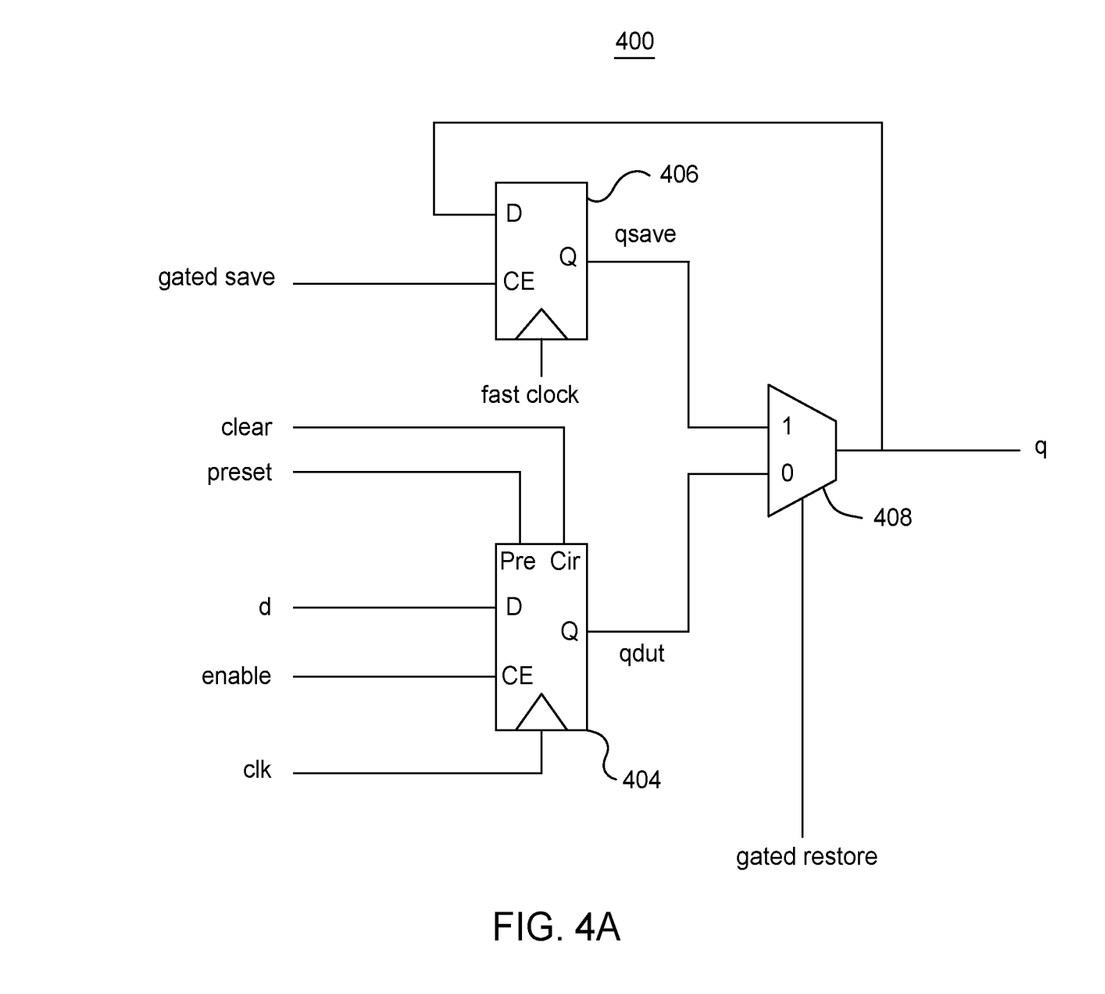
FIG. 4A illustrates an example full retention circuit.
Figure 4B:
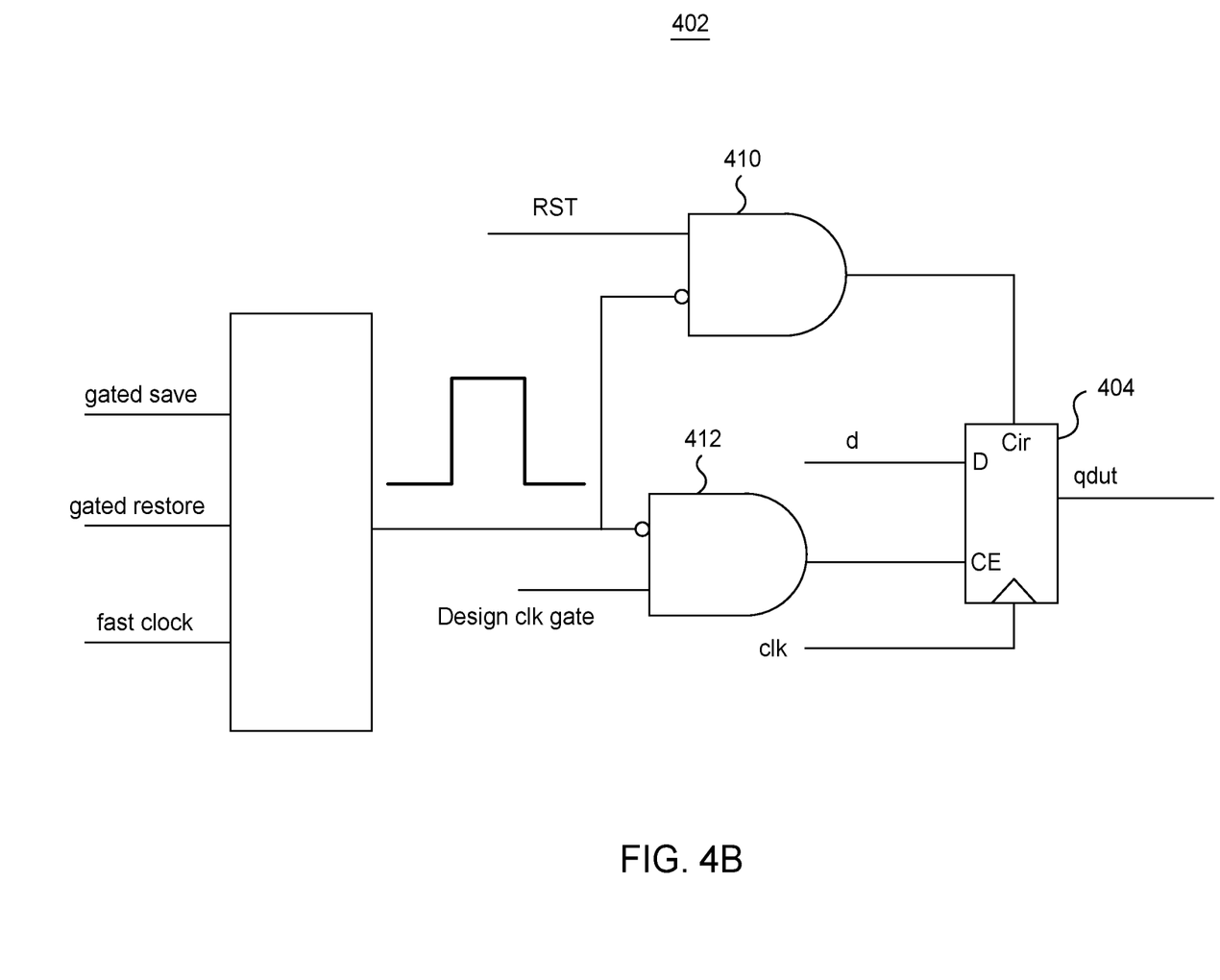
FIG. 4B illustrates an example lightweight retention circuit in the lightweight UPF flow of FIG. 1, according to an embodiment of the present disclosure.

FIGS. 4A and 4B show differences between a full retention circuit 400 and a lightweight retention circuit 402 in the lightweight UPF flow of FIG. 1. As seen in the examples of FIGS. 4A and 4B, the full retention circuit 400 and the lightweight retention circuit 402 are the same in that they both include a register 404. The full retention circuit 400 performs its retention functions through a second register 406 and a multiplexer 408. The register 406 retains the output of the register 404. The multiplexer 408 selects between the value of the register 404 and the retained value in the register 406. In this manner, the multiplexer 408 can be controlled to produce the retained value in the full retention circuit 400, as needed.

On the other hand, the lightweight retention circuit 402 includes an AND gate 410 and an AND gate 412 that are connected to the register 404, which may be a clock gate enabled register. A control signal sent into the AND gates 410 and 412 controls whether the register 404 outputs an input value (d) or retains the input value (d). For example, when the control signal is high (also referred to as a retain period), the register 404 may not be enabled and may not be reset, which may cause the register 404 to retain the input value (d). Stated differently, the control signal and the AND gate 410 prevent the register 404 from resetting or clearing its value. When the control signal is low, the register 404 may be enabled, which may cause the register 404 to output the input value (d), unless the register 404 is cleared. In this manner, the lightweight retention circuit 402 can perform the retention functions of the full retention circuit 400 without using the shadow register 406 and the multiplexer 408, which reduces the hardware costs of the retention circuit 402. Additionally, the AND gates 410 and 412 can be shared across multiple registers 404 of multiple lightweight retention circuits 402. As a result, even greater hardware cost reductions can be realized.

In an example, the full retention circuit 400 implementation may require routing of the retention shadow register 406 power and implementation of the shadow register 406, which keeps the retained value during the power off period. In the lightweight retention circuit 402, because the retainable register 404 is always on, there is no need for the shadow register 406 or the routing of retention power. The retainable register 404 is used to keep the retained value during a save event. Asynchronous set and reset of the register 404 and the clock are disabled during the save event. Until a restore event occurs, the register 404 freezes its value.

There may be two different modes of retention. First, if the clock is gated by the user, there is no need to gate the clock by the retention circuit 402. Only set and reset gating during a save event is sufficient. Second, if the clock is not gated by the user, the retention circuit 402 itself gates the register 404 on clock event during the save event. "Design clk gate" may be the clock gating logic of the original register 404 (e.g., the register 404 in the full retention circuit 400).

The system may read in the same UPF and register transfer level (RTL) as input as the system would for a full UPF implementation or prototyping flow implementation. The system may not need to apply any workarounds that are applied typically to non-UPF models. For example, the system may not need to connect a power switch control signal to a power switch acknowledgement port signal or force an RTL signal as replacement for UPF to RTL connection. The lightweight UPF implementation may automatically handle these connections when the system reads in the full UPF and implements needed lightweight power switch and UPF to RTL connections.

Several operations may be performed during optimization or simplification of the retention circuit in block 108 of FIG. 1. If the register 404 is not an enabled register, the system may also transform the register 404 into an enabled register. The system may also connect the AND gates 410 and 412 to the enabled register. For example, the system may connect the AND gate 410 to the reset/clear pin (also referred to as a reset/clear port) of the register 404. The system may also connect the AND gate 412 to the enable pin of the register 404.

In certain embodiments, the system may also connect a hardware system fast clock to the isolation circuit 302 at 108. In some embodiments, the system may also add global registers to the circuit design at 108. The global registers provide runtime control over the isolation circuit 302 and the retention circuit 402.

Some functions of the lightweight retention circuit 402 may be summarized as: (i) retention condition and domain and retention power may be ignored, (ii) save and restore conditions are honored, and (iii) no zero pin retention (e.g., no save/restore pin), only single and double pin support. The following table describes this functionality.

| Save signal | Restore Signal | Single Pin | Double pin |
|---|---|---|---|
| L | H | √ | √ |
| H | L | √ | √ |
| L | L | × | √ |
| H | H | × | √ |
| ↑ | ↓ | √ | √ |
| ↓ | ↑ | √ | √ |
| ↑ | ↑ | × | √ |
| ↓ | ↓ | × | √ |
| L or H | ↑ or ↓ | × | × |
| ↑ or ↓ | L or H | × | × |

Signal sense legend
L—low,
H—high,
↑—posedge,
↓—negedge

Figure 5:
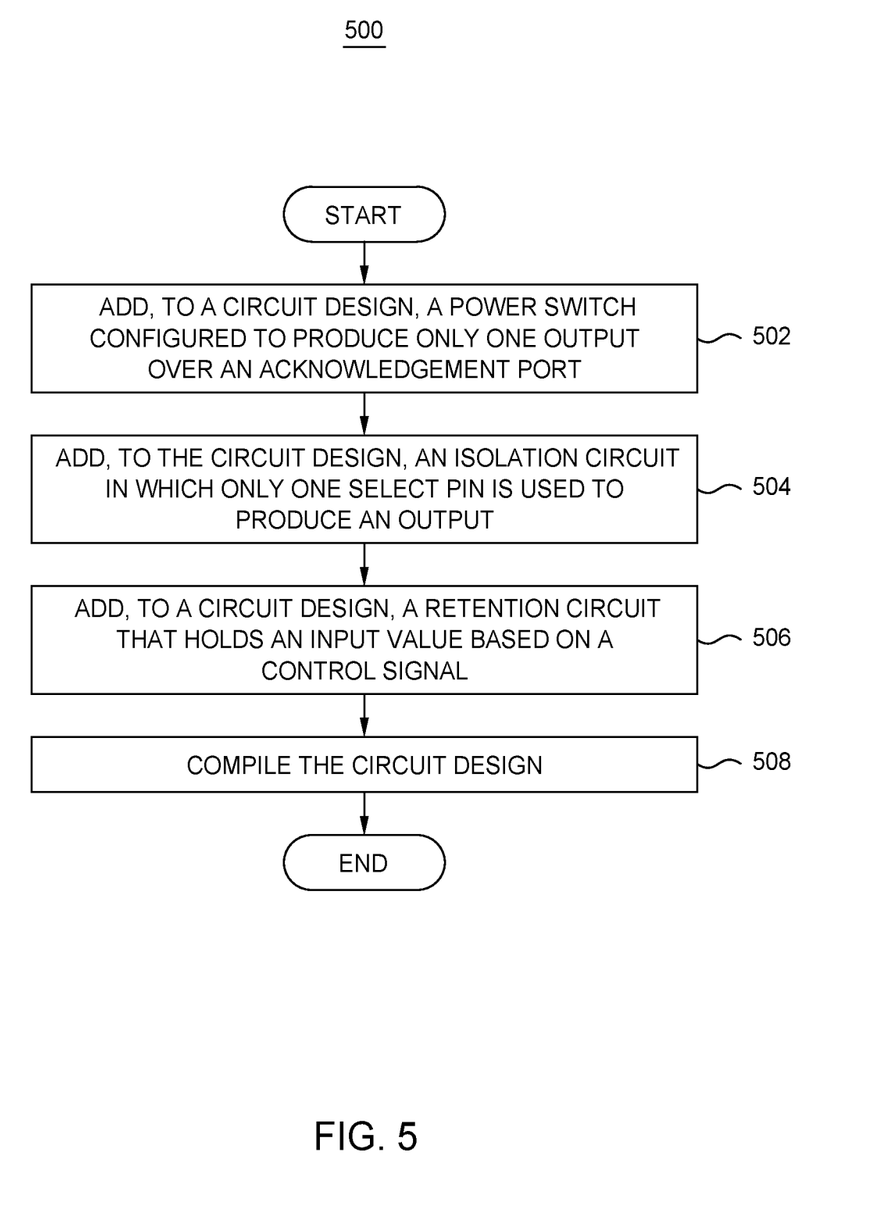
FIG. 5 is a flowchart of an example method for designing a circuit, according to an embodiment of the present disclosure.

FIG. 5 is a flowchart of an example method 500 in the lightweight UPF flow of FIG. 1. A computer system (e.g., the computer system 700 described in FIG. 7) may perform the method 500. In particular embodiments, by performing the method 500, the computer system reduces compile time and hardware costs. Additionally, the computer system improves circuit performance (e.g., increases circuit frequency).

At 502, the computer system adds, to a circuit design, a power switch 202 that produces only one output over an acknowledgement port. The power switch 202 may include a control port 204, acknowledgement logic 206, on-state logic 208, a register 210, an inverter 212, and an acknowledgement port 214. The power switch 202 may lack off-state logic 216, error state logic 218, selection logic 220, and a register 222.

At 504, the computer system adds, to the circuit design, an isolation circuit 302 in which only one select pin is used to produce an output. The isolation circuit 302 includes a driver 304, a clamp cell 306, and an AND gate 308. The output of the AND gate 308 controls the clamp cell 306. The isolation circuit 302 may lack corruption related circuitry (e.g., random value circuitry 310) and isolation policy power circuitry 312.

At 506, the computer system adds, to the circuit design, a retention circuit 402 that holds an input value based on a control signal. The retention circuit 402 may include a register 404, an AND gate 410, and an AND gate 412. The register 404 may output and/or hold an input value (d) based on a control signal into the AND gates 410 and 412. The retention circuit 402 may lack a shadow register 406 and a multiplexer 408.

At 508, the computer system compiles the circuit design. The compilation may take less time than for a full UPF implementation because of the simplified power switch 202, isolation circuit 302, and retention circuit 402.

Figure 6:
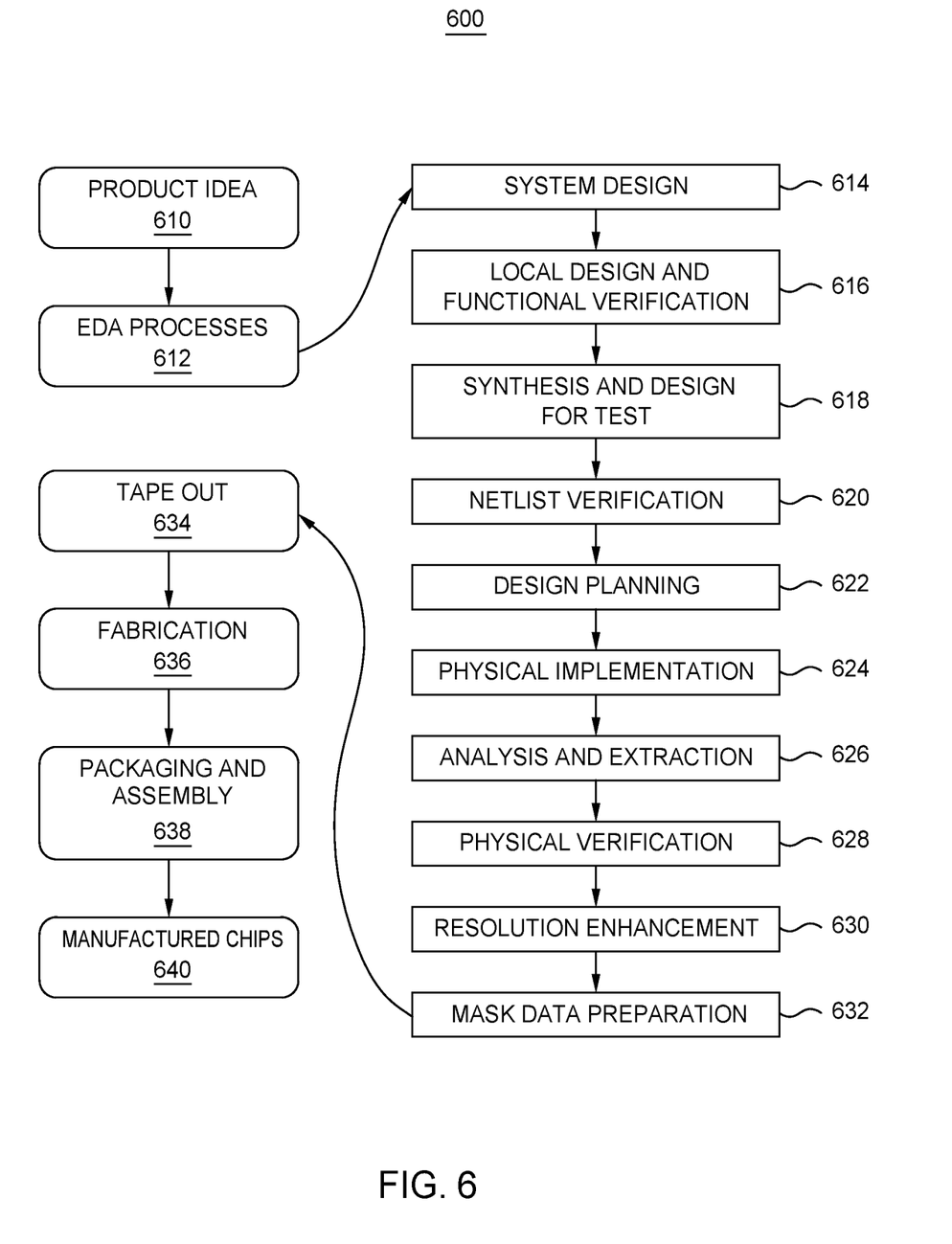
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level adds more useful detail into the design description, for example, more details for the modules that include the description. The lower levels of representation can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for designing a circuit, the method comprising:
    adding, to a circuit design, a power switch lacking an input supply port and an output supply port, wherein the power switch is configured to produce an output over an acknowledgement port;
    adding, to the circuit design, an isolation circuit lacking isolation power circuitry and corruption circuitry, wherein the isolation circuit comprises a driver configured to clamp an output of the isolation circuit, and wherein a select pin of the isolation circuit controls whether the isolation circuit outputs the clamped output or an input value;
    adding, to the circuit design, a retention circuit comprising:
        a clock gating enabled register;
        a first AND gate, wherein an output of the first AND gate is input to a clear pin of the clock gating enabled register; and
        a second AND gate, wherein an output of the second AND gate is input to a chip enable pin of the clock gating enabled register; and
    compiling, by a processing device, the circuit design that includes the power switch, the isolation circuit, and the retention circuit.

2. The method of claim 1, wherein adding the retention circuit comprises adding the clock dating enabled register to the circuit design based on removing a previous register that lacked a chip enable pin.

3. The method of claim 1, wherein the first AND gate is configured to prevent the clock dating enabled register from resetting during a retain period.

4. The method of claim 1, wherein the clock gating enabled register is configured to hold an input value based on a control signal to the first and second AND gates.

5. The method of claim 1, further comprising adding, to the circuit design, a global register that provides runtime control over the isolation circuit and the retention circuit.

6. The method of claim 1, further comprising connecting a clock signal to the isolation circuit.

7. The method of claim 1, wherein adding the power switch, the isolation circuit, and the retention circuit is based on a user selection indicating that a lightweight Unified Power Format implementation should be used.

8. A system for designing a circuit, the system comprising:
    a memory; and
    a hardware processor communicatively coupled to the memory, the hardware processor configured to:
        add, to a circuit design, a power switch lacking an input supply port and an output supply port, wherein the power switch is configured to produce an output over an acknowledgement port;
        add, to the circuit design, an isolation circuit lacking isolation power circuitry and corruption circuitry, wherein the isolation circuit comprises a driver configured to clamp an output of the isolation circuit, and wherein a select pin of the isolation circuit controls whether the isolation circuit outputs the clamped output or an input value;
        add, to the circuit design, a retention circuit comprising:
            a clock gating enabled register;
            a first AND gate, wherein an output of the first AND gate is input to a clear pin of the clock gating enabled register; and
            a second AND gate, wherein an output of the second AND gate is input to a chip enable pin of the clock gating enabled register; and
        compile the circuit design.

9. The system of claim 8, wherein adding the retention circuit comprises adding the clock gating enabled register to the circuit design based on removing a previous register that lacked a chip enable pin.

10. The system of claim 8, wherein the first AND gate is configured to prevent the clock gating enabled register from resetting during a retain period.

11. The system of claim 8, wherein the clock gating enabled register is configured to hold an input value based on a control signal to the first and second AND gates.

12. The system of claim 8, wherein the hardware processor is further configured to add, to the circuit design, a global register that provides runtime control over the isolation circuit and the retention circuit.

13. The system of claim 8, wherein the hardware processor is further configured to connect a clock signal to the isolation circuit.

14. The system of claim 8, wherein adding the power switch, the isolation circuit, and the retention circuit is based on a user selection indicating that a lightweight Unified Power Format implementation should be used.

15. A non-transitory computer-readable medium storing computer instructions that, when executed, cause a processor to perform an operation for designing a circuit, the operation comprising:
    adding, to a circuit design, a power switch lacking an input supply port and an output supply port, wherein the power switch is configured to produce an output over an acknowledgement port based on one or more signals provided over only a control port;

adding, to the circuit design, an isolation circuit comprising a driver configured to clamp an output of the isolation circuit, wherein a select pin of the isolation circuit controls whether the isolation circuit outputs the clamped output or an input value;

adding, to the circuit design, a retention circuit comprising:
 a clock gating enabled register;
 a first AND gate, wherein an output of the first AND gate is input to a clear pin of the clock gating enabled register; and
 a second AND gate, wherein an output of the second AND gate is input to a chip enable pin of the clock gating enabled register; and
compiling the circuit design.

16. The non-transitory computer-readable medium of claim 15, wherein adding the retention circuit comprises adding the clock gating enabled register to the circuit design based on removing a previous register that lacked a chip enable pin.

17. The non-transitory computer-readable medium of claim 15, wherein the first AND gate is configured to prevent the clock gating enabled register from resetting during a retain period.

18. The non-transitory computer-readable medium of claim 15, wherein the clock dating enabled register is configured to hold an input value based on a control signal to the first and second AND gates.

19. The non-transitory computer-readable medium of claim 15, wherein the operation further comprises adding, to the circuit design, a global register that provides runtime control over the isolation circuit and the retention circuit.

20. The non-transitory computer-readable medium of claim 15, wherein the operation further comprises connecting a clock signal to the isolation circuit.

* * * * *